(12) United States Patent
Marschall et al.

(10) Patent No.: US 12,026,343 B2
(45) Date of Patent: Jul. 2, 2024

(54) INPUT ASSEMBLY WITH A COVER CONTAINING A TOUCH-SENSITIVE INPUT SURFACE AND A LUMINOUS SURFACE

(71) Applicant: Preh GmbH, Bad Neustadt a.d. Saale (DE)

(72) Inventors: Alexander Marschall, Kaltensundheim (DE); Marc Sauer, Künzell (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 0 days.

(21) Appl. No.: 18/338,062

(22) Filed: Jun. 20, 2023

(65) Prior Publication Data

US 2024/0004502 A1 Jan. 4, 2024

(30) Foreign Application Priority Data

Jun. 29, 2022 (DE) ...................... 10 2022 116 222.2

(51) Int. Cl.
| | |
|---|---|
| *G06F 3/044* | (2006.01) |
| *B60Q 3/20* | (2017.01) |
| *F21V 11/00* | (2015.01) |
| *F21W 106/00* | (2018.01) |

(52) U.S. Cl.
CPC ............. *G06F 3/044* (2013.01); *B60Q 3/20* (2017.02); *F21V 11/00* (2013.01); *F21W 2106/00* (2018.01)

(58) Field of Classification Search
CPC .. B60Q 3/14; B60Q 3/20; F21V 11/00; F21W 2106/00; G06F 3/044
See application file for complete search history.

(56) References Cited

FOREIGN PATENT DOCUMENTS

| | | |
|---|---|---|
| DE | 102006013937 A1 | 9/2007 |
| DE | 102018110033 | 5/2019 |
| DE | 102016123118 B4 | 6/2020 |
| DE | 102020120711 A1 | 2/2022 |

OTHER PUBLICATIONS

German Office Action for DE 10 2022 116 222.2 dated Mar. 9, 2023. German Patent and Trade Mark Office, Munich, Germany.

*Primary Examiner* — Jason M Han
(74) *Attorney, Agent, or Firm* — M&B IP Analysts, LLC

(57) ABSTRACT

The present disclosure relates to an input assembly, including: a cover having a touch-sensitive operating surface facing an operator and a rear surface facing away from the operator, wherein the operating surface contains a luminous surface; a support arranged on the side of the cover facing away from the operator; a light source arranged on the support to couple light into the cover via an entry surface, in order to backlight the luminous surface, wherein the cover is transparent in the region between the entry surface and the luminous surface; a transparent film layer structure arranged between the cover and the light source, with a conductive coating for forming an electrode for a capacitive touch sensor system; wherein the entry surface is formed by a recess in the rear surface of the cover, and wherein a ventilated hollow volume is formed between the film layer structure and the entry surface.

16 Claims, 2 Drawing Sheets

INPUT ASSEMBLY WITH A COVER CONTAINING A TOUCH-SENSITIVE INPUT SURFACE AND A LUMINOUS SURFACE

The present disclosure relates to an input assembly with a cover having at least one or several touch-sensitive operating surfaces facing towards an operator and a rear surface facing away from the operator, wherein the operating surface in each case contains a luminous surface to be backlit. In order to avoid damage to the cover when the cover is touched, in particular actuated, but also in order to preclude, if possible, the cover from being yielding and provide the cover with a high-quality visual but also haptically attractive appearance, the cover, which is generally formed from a plastic, typically has a comparatively high overall layer thickness, also referred to as material thickness, of several millimeters. This high material thickness is a drawback when the intent is to backlight the luminous surface across its entire extent with a light density that is as high, in particular uniform, as possible, because to this end, light from a light source has to be transmitted through the cover, wherein, thus, light is coupled into the cover from a light source arranged on a side of the cover facing away from the operator, via an entry surface in a rear surface arranged so as to face away from the operator, in order to exit from the luminous surface, which is opposite the entry surface and formed in the operating surface. In order to improve the transmission of light, the cover is regularly "thinned" on the whole, which has disadvantageous effects on the haptic properties. However, in the case of input assemblies with a comparatively extensive cover, for instance, particularly in those with several operating surfaces in which only a single common detection means is provided for detecting a change in position, a high rigidity of the cover is required, on the whole, in order to ensure a low-loss force flow from the actuation point to the detection means. Usually, a capacitive touch sensor system with a film layer structure with one or several electrodes formed from a conductive coating is used in such input assemblies, wherein the film layer structure is arranged adjacent to the rear surface of the cover.

Against this background, there was a demand for an input assembly that is improved with regard to the quality of the sensitivity to touch, particularly with regard to the permanence of a sensitivity to touch that is as homogeneous as possible across the input surface, but also with regard to the quality of the illumination of the luminous surface, such as the homogeneity of the light distribution, and the mechanical stability. This object is achieved by an input assembly according to claim 1. An equally advantageous use is the subject matter of the use claim. Advantageous embodiments are in each case the subject matter of the dependent claims. It must be noted that the features cited individually in the claims can be combined with each other in any technologically meaningful manner and represent other embodiments of the invention. The description, in particular in connection with the figures, additionally characterizes and specifies the disclosed embodiments.

The present disclosure relates to an input assembly having a cover. The cover has at least one touch-sensitive operating surface facing towards an operator and a rear surface facing away from the operator. In this case, the operating surface contains a luminous surface to be backlit. The cover has one or several layers of a thermoplastic material, for instance. In the case of several operating surfaces, they are separated by haptic feeling aids, for instance.

Moreover, the cover may have an outer protective paint layer provided on the side of the cover facing the operator and/or an opaque paint layer, wherein the opaque protective paint layer depicts a symbol or the luminous surface is formed as a mask in the form of an inverse depiction of the symbol. For example, the luminous surface has a planar configuration. Preferably, the operating surface has a planar configuration.

The input assembly according to the disclosed embodiments further has a support arranged on the side of the cover facing away from the operator, which serves for fixing the input assembly to a supporting structure, such as a vehicle body, for instance. The support is formed from a metal, a metallic alloy or a thermoplastic material, for instance. A light source is fixed on the support, which, in order to backlight the luminous surface, is arranged such that light is coupled into the cover via an entry surface facing towards the light source and formed in the rear surface. In this case, according to the present disclosure, the cover is configured to be transparent at least in the region between the entry surface and the luminous surface. For example, the light source is arranged on a circuit board, which in turn is fixed to the support.

According to the present disclosure, there is a transparent film layer structure arranged between the cover and the light source, with a conductive coating for forming at least one electrode for a capacitive touch sensor system. For example, by means of the electrode of a detection device, a measuring capacitance is formed relative to ground or vehicle ground, or relative to another electrode, which is also located on the film layer structure and electrically insulated from the first electrode. In this case, the measuring capacitance is affected by a finger of the operator coming closer to the input surface, at the latest when the input surface is touched, which is detected by the detection device and, in the case of a positive detection of the touch, triggers a change in the switching state. In another configuration, the film layer structure has an array of several electrodes for spatially resolved capacitive touch detection.

According to the present disclosure, the entry surface is formed in or by a recess in the rear surface of the cover. A recess is understood to be a depression in the rear surface of the cover. It is preferably provided that the layer thickness of at least one layer of the cover in the region of the recess is reduced by the recess, compared to the region of the layer directly surrounding the recess, particularly in comparison with the entire remaining area of the cover. More preferably, the recess provides for a reduction in the overall layer thickness of the cover in the region of the cover respectively affected by the recess. Preferably, the overall layer thickness of the cover outside the recess is no smaller than 1 mm, preferably no smaller than 1.5 mm.

According to the present disclosure, it is provided that a ventilated hollow volume is formed between the film layer structure and the entry surface of the cover. A ventilated hollow volume is understood to be a hollow volume which is in fluid-conducting communication with the air volume surrounding the input assembly. For example, a fluid-conducting air duct is provided between the hollow volume and the surroundings of the input assembly. Preferably, the hollow volume is ventilated via a through-hole in the film layer structure. Preferably, the through-hole is provided in a region of the film layer structure which is not covered by the light of the light source directed onto the entry surface.

While the recess provides for an influence on the entrance of light and, in particular, for an increased light intensity of the light passing through the cover, the hollow volume, which is ventilated and thus open towards the surroundings, ensures that a temperature-related or air pressure-related relative positional change of the film layer structure relative to the input surface does not occur, which affects the sensitivity of the touch recognition or at least calls into question the reproducibility of the triggering of a positive touch detection.

Preferably, the entry surface is configured to be curved, preferably convexly curved, most preferably convexly curved several times.

Preferably, the film layer structure, on the side thereof facing towards the light source, spans across another ventilated hollow volume. This provides for an air-pressure equalization on both sides, thus preventing an air pressure-related displacement of the film layer structure affecting the reproducibility of the touch recognition.

According to a preferred embodiment, the layer thickness of a layer of the cover, more preferably an overall layer thickness of the cover, varies locally along a linear extent across the entry surface through the geometric center point thereof. More preferably, it varies continuously.

In a most preferred embodiment, a layer thickness distribution or overall layer thickness distribution of the cover, which is determined along the extent, correlates with a light density distribution of the light source determined along the same extent. In other words, along a straight extent from an outer edge of the entry surface through the geometric center point of the entry surface to the opposite edge of the entry surface, a local increase of the layer thickness or overall layer thickness is linked to a local increase in light density, whereby the luminous surface exhibits a higher uniformity in local backlighting along an extent corresponding to the light propagation in the cover. The highest light density and highest layer thickness or highest overall layer thickness are located at the geometric center point of the entry surface, for example, while further, the locations of the locally lowest light density and locally lowest layer thickness or overall layer thickness also coincide from the point of view of the observer.

According to a preferred embodiment, a cover support is further provided, on which the cover is at least supported, preferably fixed, wherein the cover support has a light shaft surrounding the light source and forming the further ventilated hollow volume, in order to conduct the light of the light source towards the entry surface, and the film layer structure is clamped between the cover and the cover support. For example, the cover support is formed from an opaque material, such as an opaque plastic.

Preferably, the cover has supporting bases, formed in the rear surface and protruding towards the cover support, by means of which the cover is supported on the cover support.

According to a preferred embodiment of the input assembly according to the present disclosure, the cover and the cover support form an actuating part which, when an actuating force acts on the input surface against a restoring force generated by a restoring member, such as a spring member, associated with the input assembly, can be moved from a rest position into an actuated position along an adjustment path. The adjustment path is substantially perpendicular to the input surface, for instance. In this case, the input assembly further has a detection means for detecting a change in position of the actuating part, such as an electromechanical switch, a capacitively, inductively, resistively, inductively or piezoelectrically detecting force sensor or the like.

Preferably, the actuating part is mechanically guided during the movement from the rest position into the actuated position, and exhibits a tongue-and-groove engagement acting between the support and the cover support or the cover, and/or a lever guide.

In this case, the input assembly preferably has only one detection means for detecting a change in position of the actuating part, such as an electromechanical switch, a capacitively, inductively, resistively, inductively or piezo-electrically detecting force sensor or the like.

Preferably, further ventilated hollow volumes are provided between the cover and the interposed support.

The present disclosure further relates to a use of the input assembly in any one of the above-described embodiments in a motor vehicle.

The various disclosed embodiments are explained further with reference to the following Figures. The Figures are to be understood only as examples and merely represent preferred variants of the embodiments. In the Figures.

Figure 1:
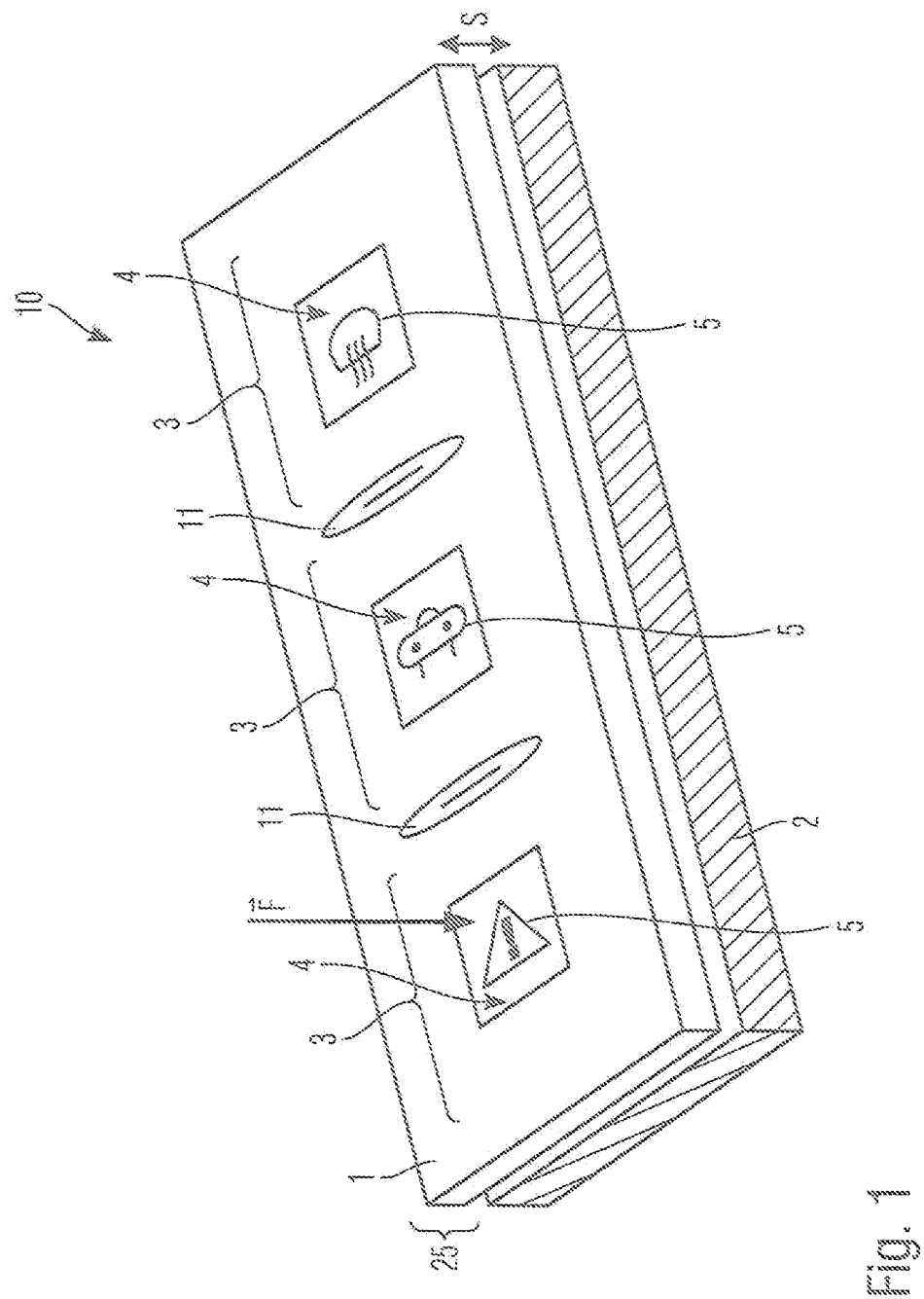
FIG. 1 shows a perspective of an embodiment of the input assembly 10 according to an embodiment.
Figure 2:
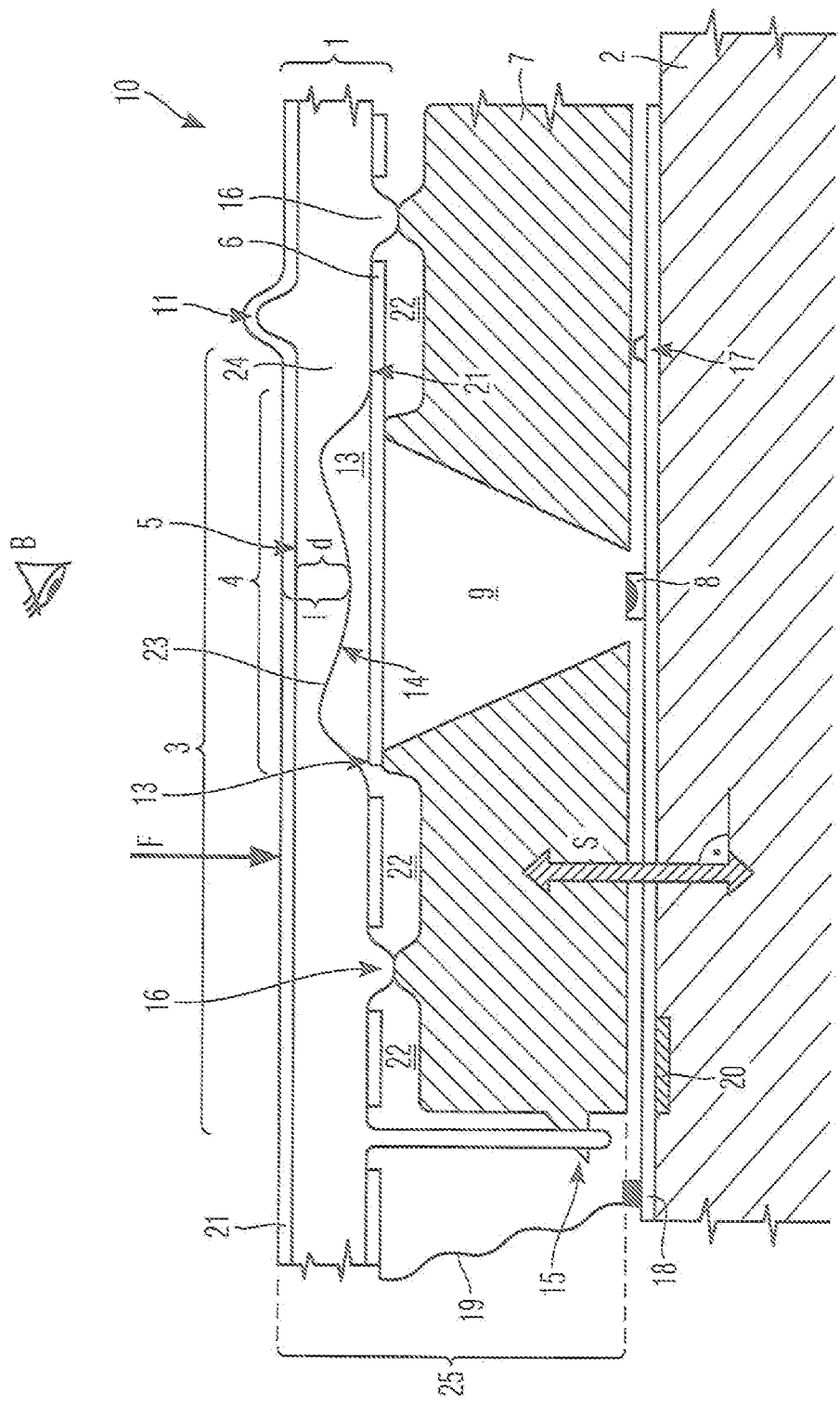
FIG. 2 shows a sectional view of the embodiment of the input assembly 10 according to an embodiment, which is shown in FIG. 1.

FIGS. 1 and 2 show an embodiment according to an embodiment of the input assembly 10. The latter has a cover 1. The cover 1 has at least one, in this case several, touch-sensitive operating surfaces 3 facing towards an operator B and a rear surface 21 facing away from the operator B. In this case, the operating surface 3 in each case contains a luminous surface 4 to be backlit. The cover 1 has a layer 24 having a transparent thermoplastic material. The several operating surfaces 3 are separated by haptic feeling aids 11.

The cover 1 further has an outer protective paint layer 21 provided on the side of the cover 1 facing towards the operator and an opaque paint layer 5, which depicts a symbol or forms, as a mask, the luminous surface in the form of an inverse depiction of the symbol, which is provided between the protective paint layer 21 and the layer 24 having a transparent thermoplastic material. Here, the luminous surface 4 and the operating surface 3 each have a planar configuration.

The input assembly 10 according to an embodiment further has a support 2 arranged on the side of the cover 1 facing away from the operator B, which serves for fixing the input assembly 10 to a supporting structure, such as a vehicle body, for instance. The support 2 is formed from a metal, a metallic alloy or a thermoplastic material, for instance. A circuit board 18 with a light source 8 is fixed on the support 2, which, in order to backlight the luminous surface 4, is arranged such that light is coupled into the cover 1 via an entry surface 14 facing towards the light source 8 and formed in the rear surface 21 of the cover 1. In this case, according to an embodiment, the cover 1 is configured to be substantially transparent at least in the region between the entry surface 14 and the luminous surface 4.

There is also a transparent film layer structure 6 arranged between the cover 1 and the light source 8, with a conductive coating for forming at least one electrode for a capacitive touch sensor system. By means of the electrode of a detection device 20, which is arranged on the circuit board 18 and connected to the electrode or electrodes in an electrically conductive manner via the flexible conductor 19, a measuring capacitance is formed relative to ground or vehicle ground, or relative to another electrode, which is also located on the film layer structure 6 and electrically insulated from the first electrode. In this case, the measuring capacitance is affected by a finger of the operator B coming closer to the input surface 3, at the latest when the input surface 3 is touched, which is detected by the detection device 20 and, in the case of a positive detection of the touch, triggers a change in the switching state. In another configuration, the film layer structure 6 has an array of several selectively controllable electrodes for spatially resolved capacitive touch detection.

As can be seen in FIG. 2, the entry surface 14 is formed in or by a recess 23 in the rear surface 21 of the cover 1. A recess 23 is understood to be a depression in the rear surface 21 of the cover 1. It is preferably provided in this case that the layer thickness d of at least one layer 24 of the cover 1 in the region of the recess is reduced by the recess 23 compared to the region of the layer 24 directly surrounding the recess, particularly in comparison with the entire remaining area of the cover 1. In the illustrated embodiment, the recess 23 further provides for a reduction in the overall layer thickness D of the cover 1 in the region of the cover 1 respectively affected by the recess 23. Here, the overall layer thickness of the cover 2 outside the recess 23 is no smaller than 5.0 mm.

According to an embodiment, it is provided that a ventilated hollow volume 12 is formed between the film layer structure 6 and the entry surface 14 of the cover 1. A ventilated hollow volume 12 is understood to be a hollow volume which is in fluid-conducting communication with the air volume surrounding the input assembly 10. For this purpose, a fluid-conducting air duct is provided between the hollow volume 12 and the surroundings of the input assembly 10; in particular, the hollow volume 12 is ventilated via a through-hole 13 in the film layer structure 6. In this case, the through-hole 13 is provided in a region of the film layer structure 6 which is not covered by the light of the light source 8 directed onto the entry surface 14.

While the recess 23 provides for an influence on the entrance of light and, in particular, for an increased light intensity of the light passing through the cover 1, the hollow volume 12, which is ventilated and thus open towards the surroundings, ensures that a temperature-related or air pressure-related relative positional change of the film layer structure 6 relative to the input surface 3 does not occur, which affects the sensitivity of the touch recognition or at least calls into question the reproducibility of the triggering of a positive touch detection.

As is shown, the entry surface 14 is configured to be curved, in particular convexly curved in the central region around its center. In this case, the film layer structure 6, on the side thereof facing towards the light source 8, spans across another ventilated hollow volume 9. This provides for an air-pressure equalization on both sides, thus preventing an air pressure-related displacement of the film layer structure 6 affecting the reproducibility of the touch recognition.

In the illustrated embodiment, the overall layer thickness D of the cover 1 varies locally, and in this case continuously, along a linear extent across the entry surface 14 through the geometric center point thereof, wherein a distribution of the overall layer thickness D of the cover 1, which is determined along the extent, correlates with a light density distribution of the light source 8 determined along the same extent. In other words, along a straight extent from an outer edge of the entry surface 14 through the geometric center point of the entry surface 14 to the opposite edge of the entry surface 14, a local increase of the overall layer thickness D is linked to a local increase in light density, whereby the luminous surface 4 exhibits a higher uniformity in local backlighting along an extent corresponding to the light propagation in the cover 1. The highest light density and highest overall layer thickness D are located at the geometric center point of the entry surface 14, for example. While the locations of the locally lowest light density and locally lowest overall layer thickness D also coincide from the point of view of the observer B.

Further, a cover support 7 is provided, on which the cover 1 is supported and fixed, wherein the cover support 7 has a light shaft surrounding the light source 8 and forming the further ventilated hollow volume 9, in order to conduct the light of the light source 8 towards the entry surface 14, and wherein the film layer structure 6 is clamped between the cover 1 and the cover support 7. For example, the cover support 7 is formed from an opaque material, such as an opaque plastic, in particular an opaque thermoplastic material. In order to fix the cover 1 on the cover support 7, cooperating latching means 15 are provided.

Here, the cover 1 has supporting bases 16, formed in the rear surface 21 and protruding towards the cover support 7, which reach through correspondingly arranged through-holes in the film layer structure 6 and by means of which the cover 1 is supported on the cover support 7. In this case, further ventilated hollow volumes 22 are provided between the cover 1 and the interposed support 7.

As depicted in the illustrated embodiment, the cover 1 and the cover support 7 together form an actuating part 25 which, when an actuating force F acts on the input surface 3 against a restoring force generated by a restoring member, such as a spring member, which is associated with the input assembly 10 and not depicted, can be moved from a rest position into an actuated position along an adjustment path s, which is substantially perpendicular to the input surface 3. For example, the adjustment path is only a fraction of a millimeter. In this case, the input assembly 10 has a detection means 7 for detecting a change in position of the actuating part 25, such as an electromechanical switch, a capacitively, inductively, resistively, inductively or piezo-electrically detecting force sensor or the like.

What is claimed is:

1. An input assembly, comprising:
   a cover having at least one touch-sensitive operating surface facing towards an operator and a rear surface facing away from the operator, wherein the at least one operating surface contains a luminous surface to be backlit;
   a support arranged on a side of the cover facing away from the operator;
   a light source arranged on the support, which is arranged to couple a light into the cover via an entry surface facing towards the light source and formed in the rear surface, in order to backlight the luminous surface, wherein the cover is configured to be transparent at least in a region between the entry surface and the luminous surface; and
   a transparent film layer structure arranged between the cover and the light source, with a conductive coating for forming at least one electrode for a capacitive touch sensor system;
   wherein the entry surface is formed in or by a recess in the rear surface of the cover, and wherein a ventilated hollow volume is formed between the film layer structure and the entry surface of the cover.

2. The input assembly according to claim 1, wherein the entry surface is configured to be curved.

3. The input assembly according to claim 1, wherein a layer thickness of at least one layer of the cover is reduced by the recess compared to a region of the layer directly surrounding the recess.

4. The input assembly according to claim 3, wherein the layer thickness of the at least one layer of the cover or an overall layer thickness of the cover, varies locally, along a linear extent across the entry surface through a geometric center point thereof.

5. The input assembly according to claim 4, wherein a distribution of the layer thickness or of the overall layer thickness of the cover, which is determined along the linear extent, correlates with a light density distribution of the light source determined along the linear extent.

6. The input assembly according to claim 4, wherein the overall layer thickness of the cover outside the recess is no smaller than 5.0 mm.

7. The input assembly according to claim 3, wherein the layer thickness of the at least one layer of the cover or an overall layer thickness of the cover, varies locally in a continuous manner, along a linear extent across the entry surface through a geometric center point thereof.

8. The input assembly according to claim 1, wherein the hollow volume is ventilated via a through-hole in the film layer structure.

9. The input assembly according to claim 1, wherein the film layer structure, on a side thereof facing towards the light source, spans across another ventilated hollow volume.

10. The input assembly according to claim 1, further comprising a cover support on which the cover is at least supported, and the cover support has a light shaft surrounding the light source and forming the another ventilated hollow volume, in order to conduct the light of the light source towards the entry surface, and the film layer structure is clamped between the cover and the cover support.

11. The input assembly according to claim 10, wherein the cover has supporting bases, formed in the rear surface and protruding towards the cover support, by means of which the cover is supported on the cover support.

12. The input assembly according to claim 10, wherein the cover and the cover support form an actuating part which, when an actuating force acts on the at least one operating surface against a restoring force generated by a restoring member associated with the input assembly, is moved from a rest position into an actuated position along an adjustment path, and wherein the input assembly has a detection sensor, wherein the detection sensor is adapted to detect a change in position of the actuating part.

13. The input assembly according to claim 10, wherein the cover is fixed on the cover support.

14. The input assembly according to claim 1, wherein further ventilated hollow volumes are provided between the cover and an interposed support.

15. The input assembly according to claim 1 is used in a motor vehicle.

16. The input assembly according to claim 1, wherein the entry surface is configured to be convexly curved.

\* \* \* \* \*